United States Patent
Kamfjord

(10) Patent No.: US 10,596,465 B1
(45) Date of Patent: Mar. 24, 2020

(54) METHOD AND APPARATUS FOR PROVIDING A COMPUTER IMPLEMENTED GAME

(71) Applicant: KING.COM LIMITED, St. Julians (MT)

(72) Inventor: Par Kamfjord, Stockholm (SE)

(73) Assignee: KING.COM LTD., St. Julians (MT)

( * ) Notice: Subject to any disclaimer, the term of this patent is extended or adjusted under 35 U.S.C. 154(b) by 0 days.

(21) Appl. No.: 16/157,828

(22) Filed: Oct. 11, 2018

(51) Int. Cl.
*A63F 13/52* (2014.01)

(52) U.S. Cl.
CPC .................... *A63F 13/52* (2014.09)

(58) Field of Classification Search
USPC .......................................................... 463/9
See application file for complete search history.

(56) References Cited

U.S. PATENT DOCUMENTS

| | | | |
|---|---|---|---|
| 9,901,834 B2 * | 2/2018 | Willman | A63F 13/52 |
| 2019/0099660 A1 * | 4/2019 | Nelson | A63F 3/00157 |
| 2019/0232155 A1 * | 8/2019 | Darabian | A63F 13/77 |

* cited by examiner

*Primary Examiner* — Pierre E Elisca
(74) *Attorney, Agent, or Firm* — Saul Ewing Arnstein & Lehr LLP

(57) ABSTRACT

A computer device has a display which displays game elements in a game board. In a move, one or more game elements is removed from the game board and the game board is displayed on the display to be refilled. The computer device is configured to cause images showing at least the removal of the game elements and the refilling of the game board to be displayed on the display at a rate which increases over time.

27 Claims, 10 Drawing Sheets

METHOD AND APPARATUS FOR PROVIDING A COMPUTER IMPLEMENTED GAME

FIELD OF THE INVENTION

Embodiments of this application relate to a user device for use in playing a computer implemented game.

Some embodiments may relate to engaging users or players in a computer game executable in an online environment.

Some embodiments relate to a user device which supports an app.

Some embodiments may have particular, but not exclusive application in the field of computer implemented applications, in an online or offline environment, and computing devices therefor.

Some embodiments may relate to engaging a user of the app while the user is interacting with the app.

BACKGROUND OF THE INVENTION

In the field of computer-implemented games, there are many technical challenges facing the designer of such games when considering how, for example, the user interface is to be controlled in the context of computer devices available to play the game.

One technical challenge can involve allowing a game to be fun and compelling even when there is limited display resource available, such as when a game is being played on a smartphone, tablet or other minicomputer. Another significant challenge is that of user engagement. Engagement involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce player sense of success and accomplishment.

A common genre of casual games is so-called match games. This is a type of tile-matching game where the player manipulates tiles or game objects according to a matching criterion.

A match-three game is a type of casual puzzle game where the player is required to find patterns on a seemingly chaotic board. The player then has to match three or more of the same type of game element on the game board and those matched elements will then disappear. An existing type of match-three game is a so-called "switcher" game. In a switcher game, the player switches place of two adjacent game elements on the game board so that one or both of them create a chain of at least three adjacent game elements of the same type. Those matched game elements will then disappear. The game board is then repopulated with game objects.

One such known match three-type game is known by the trade name Candy Crush Saga. In that game, the game board is repopulated with game elements which are perceived as falling downwards onto the game board from the top edge of the screen from which the game is played.

Another known type of game is "linker game", where a sequence of game elements are linked to form a known sequence. Another type of game is a 'clicker' game, in which matches can be made in a board by clicking a group of adjacent game elements.

A technical challenge exists when introducing complexity into such match games. A technical challenge may arise for example when there is limited display resource available and/or in the providing of effective user engagement, such as described previously.

So called "apps" are known and are installed on a computing device such as a laptop device, a smart phone or tablet. A user of the computing device interacts with the app. A technical challenge exists in maintaining user engagement when interacting with the app. This may be a particular issue where the user engages with the app and then is prevented by the app from making a further input until the app has performed or carried out a function which may be visualised graphically on a display of the computer device. This may be a particular challenge in the case where the user needs to understand the function performed or carried out in order to make an appropriate input.

This patent specification describes not only various ideas and functions, but also their creative expression. A portion of the disclosure of this patent document therefore contains material to which a claim for copyright is made and notice is hereby given: Copyright King.com Limited 2018 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

According to one aspect, there is provided a computer device comprising: a display configured to display game elements in a game board of a computer implemented game; a user interface configured to detect a first user input when a user engages with at least one game element in a move; and at least one processor configured to: (i) determine that at least one game element is to be removed from the game board which is displayed on the display, and (ii) cause the game board which is displayed on the display to be refilled, wherein when the game board has been refilled, the at least one processor is configured to repeat steps (i) and (ii) until there are no game elements which are to be removed in a refilled game board, wherein the at least one processor is configured to cause images showing at least the removal of the game elements and the refilling of the game board to be displayed on the display at a rate which increases over time.

The rate may be increased to a maximum rate.

The computer device may comprise a timer, the timer being started in response to the first user input.

The timer may be one of a count up and a countdown timer.

The at least one processor may be configured to capture a current time in response to the first user input.

The at least one processor may be configured to determine a current rate as the rate, the current rate being dependent on a time from the first user input.

The at least one processor may be configured to determine if at least a first given time from the first user input has elapsed and only if the given time has elapsed to increase the rate from a default rate.

The at least one processor may be configured to determine if at least a second given time from the first user input has elapsed and if so to maintain a current rate.

The at least one processor may be configured to iteratively increase the rate up to a maximum rate.

The at least one processor may be configured to determine a current rate by adding a predefined value to a previous rate.

The at least one processor may be configured to determine a current rate by performing a function.

The at least one processor may be configured to determine a current rate by performing a look up operation.

The at least one processor may be configured to determine that steps (i) and (ii) have been performed for a least a given amount of time and in response thereto to increase the rate over time up to a maximum rate.

The at least one processor may be configured such that the user input is configured to receive a second user input when a user engages with at least one game element in a next move only when there are no game elements to be removed.

The at least one processor may be configured in step (i) to determine that at least three game elements satisfy a match condition and in response thereto to remove the game elements.

According to another aspect, there is provided a computer implemented method comprising: displaying on a display game elements in a game board of a computer implemented game; detecting, via a user interface, a first user input when a user engages with at least one game element in a move; (i) determining by at least one processor that at least one game element is to be removed from the game board which is displayed on the display, (ii) causing, by the at least on processor, the game board which is displayed on the display to be refilled, wherein when the game board has been refilled, repeating steps (i) and (ii) until there are no game elements which are to be removed in a refilled game board, the method comprising causing images showing at least the removal of the game elements and the refilling of the game board to be displayed on the display at a rate which increases over time.

The rate may be increased to a maximum rate.

The method may comprise starting a timer in response to the first user input.

The timer may be one of a count up and a countdown timer.

The method may comprise capturing a current time in response to the first user input.

The method may comprise determining a current rate as the rate, the current rate being dependent on a time from the first user input.

The method may comprise determining if at least a first given time from the first user input has elapsed and only if the given time has elapsed to increase the rate from a default rate.

The method may comprise determining if at least a second given time from the first user input has elapsed and if so to maintain a current rate.

The method may comprise iteratively increasing the rate up to a maximum rate.

The method may comprise determining a current rate by adding a predefined value to a previous rate.

The method may comprise determining a current rate by performing a function.

The method may comprise determining a current rate by performing a look up operation.

The method may comprise determining a current rate by one or more of: performing a function; adding a predefined value to a previous rate; and performing a look up operation The method may comprise determining that steps (i) and (ii) have been performed for a least a given amount of time and in response thereto to increase the rate over time up to a maximum rate.

The method may comprise receiving a second user input when a user engages with at least one game element in a next move only when there are no game elements to be removed.

The method may comprise in step (i) determining that at least three game elements satisfy a match condition and in response thereto to remove the game elements According to another aspect, there is provided a computer device comprising: a display configured to display game elements of a computer implemented game; a user interface configured to detect user input when a user engages with a game element in a move; and at least one processor configured to: cause a series of images to be displayed, whereby a subsequent move by the user via the user interface is only permitted by the at least one processor when all of the series of images have been displayed, the at least one processor being configured to increase the rate at which the series images are displayed over time.

According to another aspect, there is provided a computer device comprising: a display configured to display images; a user interface configured to detect user input when a user engages with an app; at least one processor configured to, in response to the user input to cause a series of images to be displayed on the display, whereby a subsequent input by the user via the user interface is only actioned by the at least one processor when all of the series of images have been displayed, the at least one processor being configured to increase the rate at which the series of images are displayed over time.

The series of images may a video.

The rate may be increased to a maximum rate.

The computer device may comprise a timer, the timer being started in response to the first user input.

The timer may be one of a count up and a countdown timer.

The at least one processor may be configured to capture a current time in response to the first user input.

The at least one processor may be configured to determine a current rate as the rate, the current rate being dependent on a time from the first user input.

The at least one processor may be configured to determine if at least a first given time from the first user input has elapsed and only if the given time has elapsed to increase the rate from a default rate.

The at least one processor may be configured to determine if at least a second given time from the first user input has elapsed and if so to maintain a current rate.

The at least one processor may be configured to iteratively increase the rate up to a maximum rate.

The at least one processor may be configured to determine a current rate by adding a predefined value to a previous rate.

The at least one processor may be configured to determine a current rate by performing a function.

The at least one processor may be configured to determine a current rate by performing a look up operation.

According to another aspect, there is provided a computer implemented method comprising: detecting, via a user interface, user input when a user engages with an app; in response to the user input, causing by at least one processor, a series of images to be displayed on the display, auctioning by at least one processor a subsequent input by the user via the user interface is only when all of the series of images have been displayed, and increasing the rate at which the series of images are displayed over time.

The rate may be increased to a maximum rate.

The method may comprise starting a timer in response to the first user input.

The timer may be one of a count up and a countdown timer.

The method may comprise capturing a current time in response to the first user input.

The method may comprise determining a current rate as the rate, the current rate being dependent on a time from the first user input.

The method may comprise determining if at least a first given time from the first user input has elapsed and only if the given time has elapsed to increase the rate from a default rate.

The method may comprise determining if at least a second given time from the first user input has elapsed and if so to maintain a current rate.

The method may comprise iteratively increasing the rate up to a maximum rate.

The method may comprise determining a current rate by adding a predefined value to a previous rate.

The method may comprise determining a current rate by performing a function.

The method may comprise determining a current rate by performing a look up operation.

The method may comprise determining a current rate by one or more of: performing a function; adding a predefined value to a previous rate; and performing a look up operation According to another aspect, there is provided a computer device comprising: a display configured to display game elements of a computer implemented game; a user interface configured to detect user input when a user engages with a game element in a move; and at least one processor configured to: cause a series of images to be displayed, whereby a subsequent move by the user via the user interface is only permitted by the at least one processor when all of the series of images have been displayed, the at least one processor being configured to increase the rate at which the series images are displayed over time.

According to another aspect, there is provided a computer implemented method comprising: displaying on a display game elements of a computer implemented game; detecting user input via a user interface when a user engages with a game element in a move; and causing by at least one processor a series of images to be displayed, permitting by the at least one processor a subsequent move by the user via the user interface only when all of the series of images have been displayed, the method comprising increasing the rate at which the series images are displayed over time.

According to some aspects, there is provided a program product comprising a computer-readable storage device including a computer-readable program for providing a computer-implemented game, wherein the computer-readable program when executed on a computer causes the computer to perform any one or more of the method steps described previously.

According to another aspect, there is provided a computer readable non-transitory storage medium carrying one or more computer executable instructions which when run on at least one processor cause:

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF THE DRAWINGS

Embodiments will now be described by way of the accompanying drawings in which.

DETAILED DESCRIPTION OF PREFERRED EMBODIMENTS

The terms user and player are used interchangeably throughout this document and no specific meaning is intended using one or the other unless the context suggests otherwise. In the following description of various implementations of the invention, reference is made to the accompanying drawings which form a part thereof, and in which is shown by way of illustration various implementations in which the invention may be utilized. It is to be understood that other implementations may be utilized, and structural and functional modifications may be made without departing from the scope of the present invention.

A person skilled in the art will realise that the different approaches to implementing the game is not exhaustive, what is described herein are certain preferred embodiments. It is possible to implement the way in a number of variations.

Figure 4:
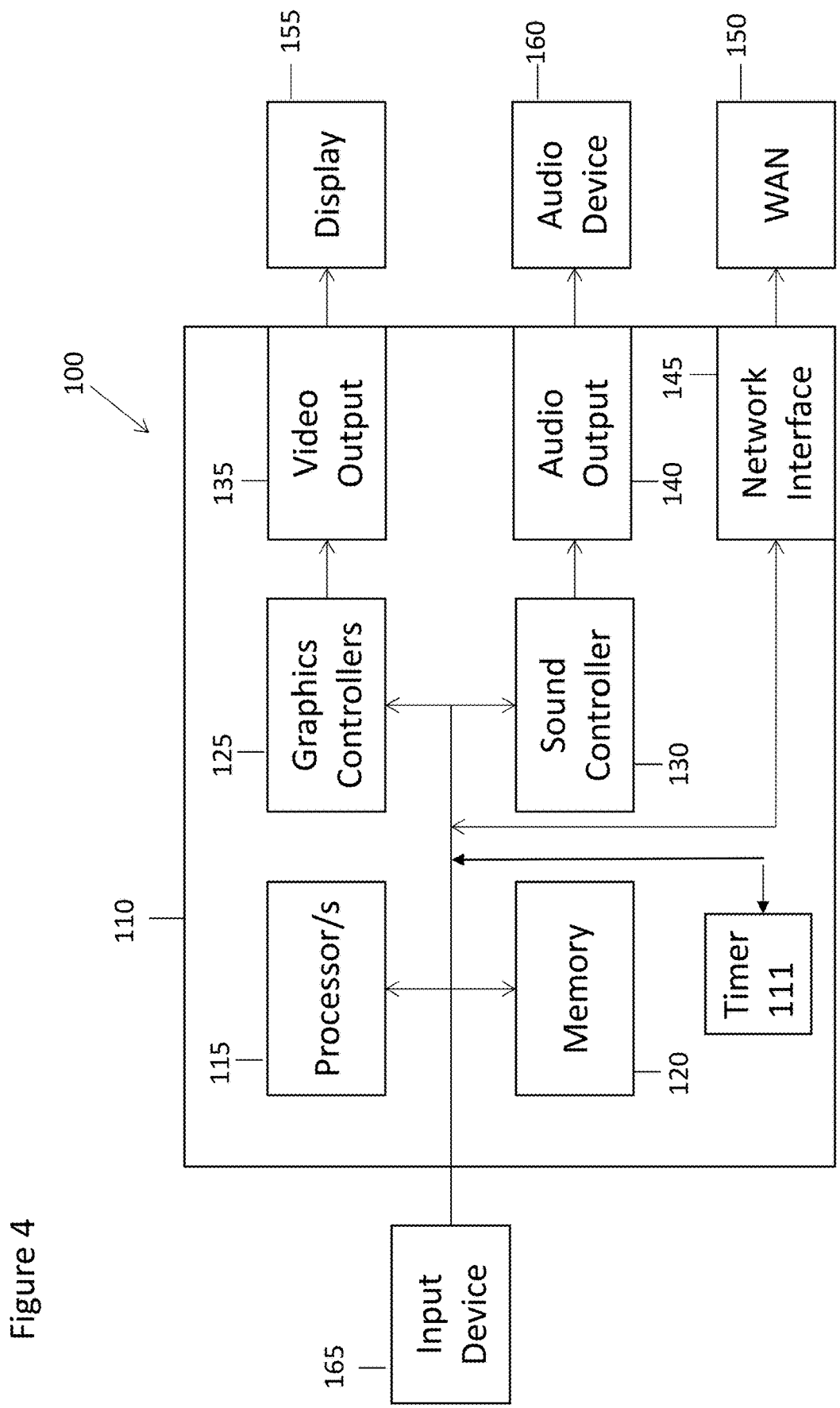
FIG. 4 shows an example user device in which some embodiments may be provided.

A schematic view of a user device 100 according to an embodiment is shown in FIG. 4. All of the blocks shown are implemented by suitable circuitry. The blocks may be implemented in hardware and/or software. The user device may have a control part 110. The control part 110 is also shown as having a graphics controller 125 and a sound controller 130. It should be appreciated that one or other or both of the graphics controller 125 and sound controller 130 may be provided by the one or more processors 115. A timer or clock 111 is also provided. This may be provided by hardware, software or a combination of the two. The timer or clock 111 may be provided at least partially by the processor.

The graphics controller 125 is configured to provide a video output 135. The sound controller 130 is configured to provide an audio output 140. The controller 110 has an interface 145 allowing the device to be able to communicate with a network 150 such as the Internet or other communication infrastructure.

The video output 135 is provided to a display 155. The audio out 140 is provided to an audio device 160 such as a speaker and or earphone(s).

The device 100 has an input device 165. The input device can take any suitable format and can be one or more of a keyboard, mouse, touch screen, joystick or game controller. It should be appreciated that the display 155 may in some embodiments also provide the input device 165 by way of an integrated touch screen for example.

The blocks of the controller 110 are configured to communicate with each other by an interconnect such as a bus or any other suitable interconnect and/or by point to point communication.

It should be appreciated that in some embodiments, the controller may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 3:
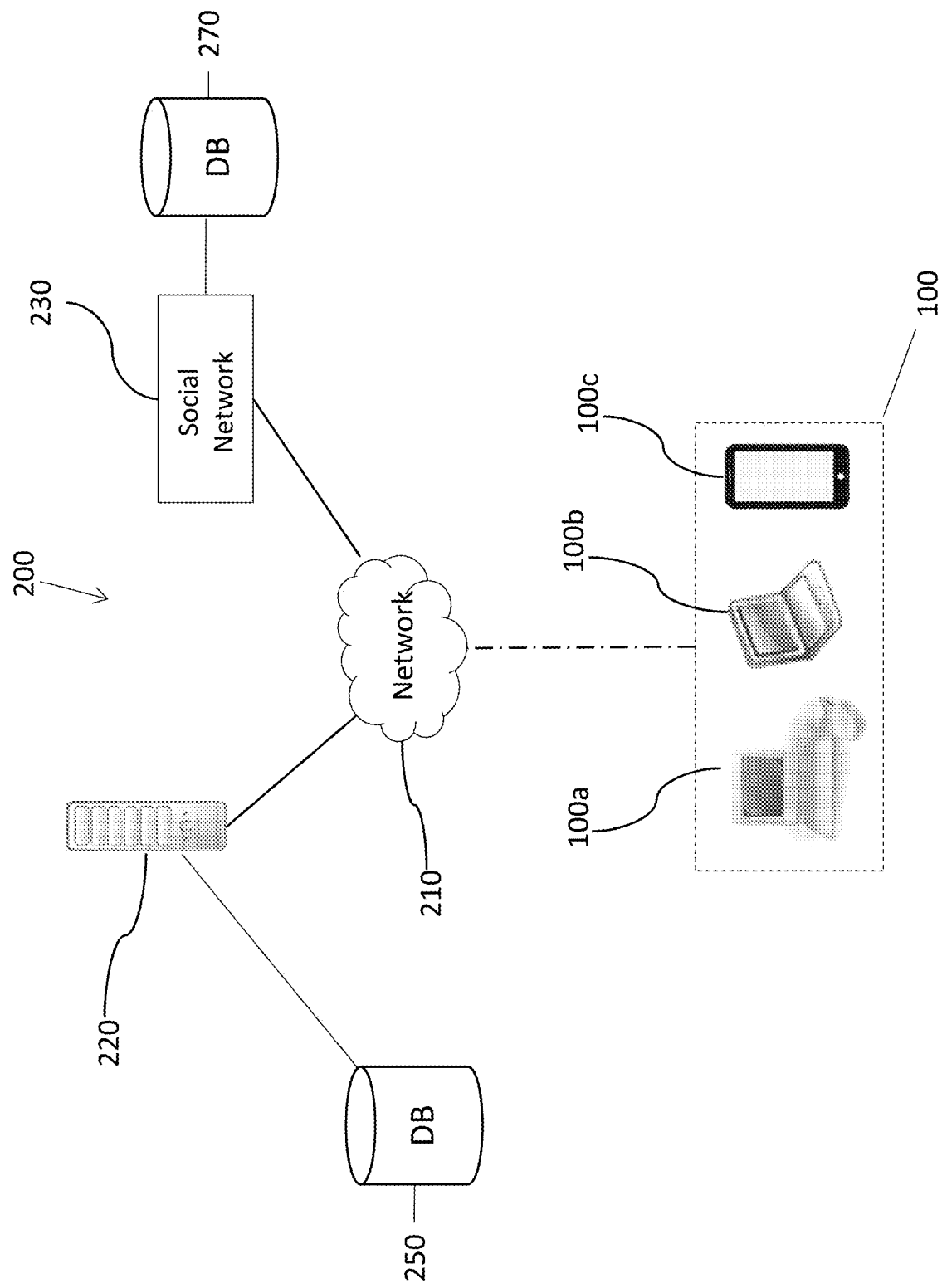
FIG. 3 shows an example system in which some embodiments may be provided.

FIG. 3 schematically shows a system 200 according to an embodiment. The system 200 comprises a server 220 which may store or be in communication with database 250 which may store game player's details, profiles, statistics etc. In practice, one or more databases 250 may be provided. Where more than one server 220 is provided, the database(s) 250 may be provided in one server 220 or across two or more servers. The server 220 may also have a games data function. This may comprise one or more units of memory to store the computer game program, user behaviour data and a processor to run the games program and process the user behaviour data.

Figure 6:
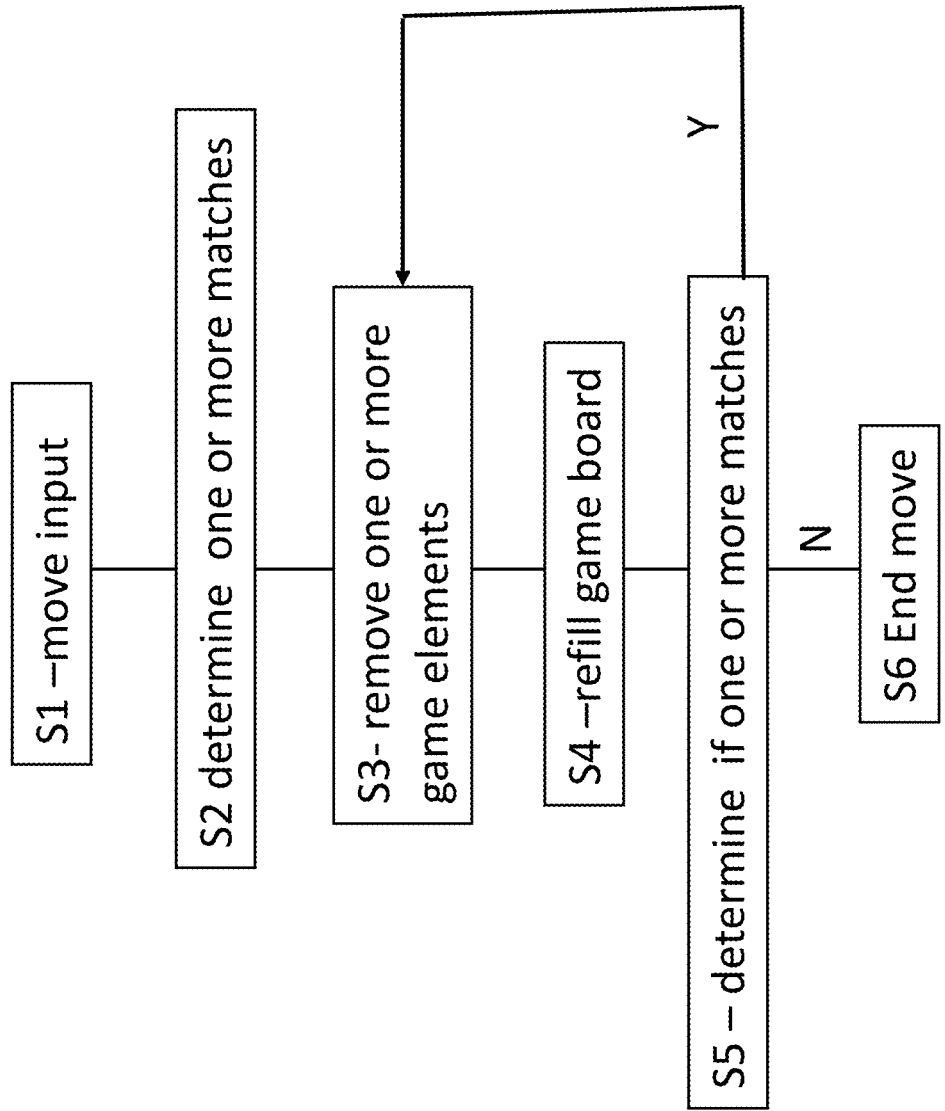
FIG. 6 shows a method flow for a move.

The server 220 may communicate via, for instance, the internet 210 to one or more client or user devices 100, shown in FIG. 6 by way of example as user devices 100a, 100b and 100c, and may further provide connections to a social network 230, for example, Facebook™. The social network 230 may also be connected to a database 270 storing social user interaction details, for instance, user to user interaction maps, friend lists, location history etc. In practice, one or more databases 270 may be provided.

It should be appreciated that embodiments may be deployed in different system architectures. For example, the computer game may be implemented as a computer game that is stored in the memory of the user device and is run on the processor of the user device. However, the server 220 may handle some elements of the game in some embodiments. By way of example only, a Java game applet may be provided to the user device 100 and the locally running Java applet will generate, for example, the graphics, sounds, and user interaction for the game play on the user device. Some data may be fed back to the server to allow interaction with other players. The data which is fed back may alternatively or additionally allow scoring and/or cross platform synchronization.

In some embodiments, the game may be implemented as a computer program that is stored in a memory of the system, for example the server, and which runs on a processor of the game server. Data streams or updates are supplied to the user device to allow the user device to render and display graphics and sounds in a browser of the user device. Such an approach is sometimes referred to as a web services approach. It should be appreciated, however, that such an approach does not necessarily require the use of the Internet.

It should be appreciated that some embodiments may be provided as stand-alone games on the user device.

Figure 1:
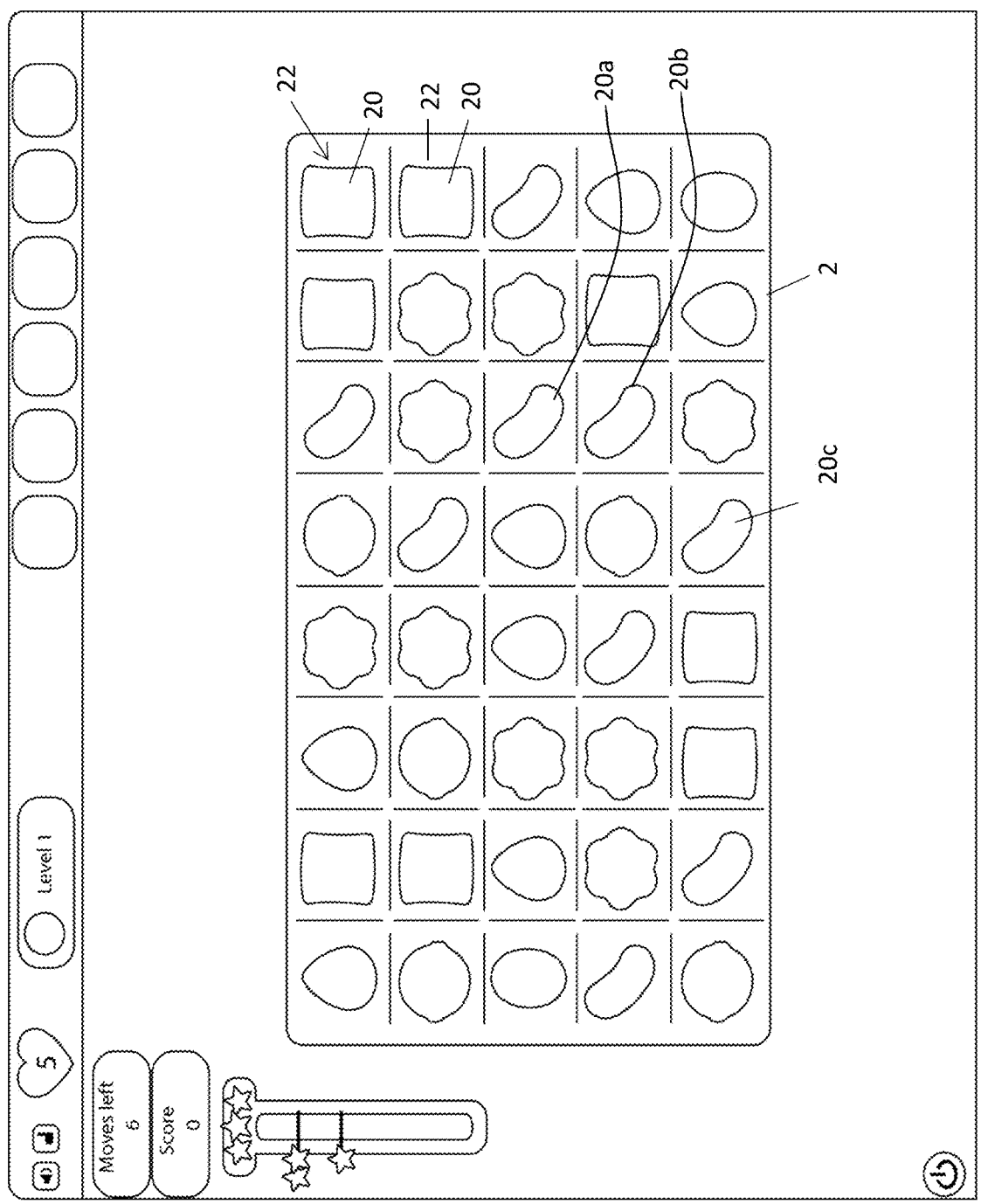
FIG. 1 is a schematic diagram of a game board of a match three game illustrating a basic example of a match three game.

FIG. 1 shows a display of a known version of a match 3 switcher game called Candy Crush Saga™. FIG. 1 illustrates a game board 2 with a plurality of game elements 20. The game elements are each of six different shapes and colours. Of course in other embodiments, there may be more or less than six different game elements. Each game element type may be defined by one or more of particular characteristics, for example a particular shape and colour combination. Each game element is supported by a tile 22.

Figure 2:
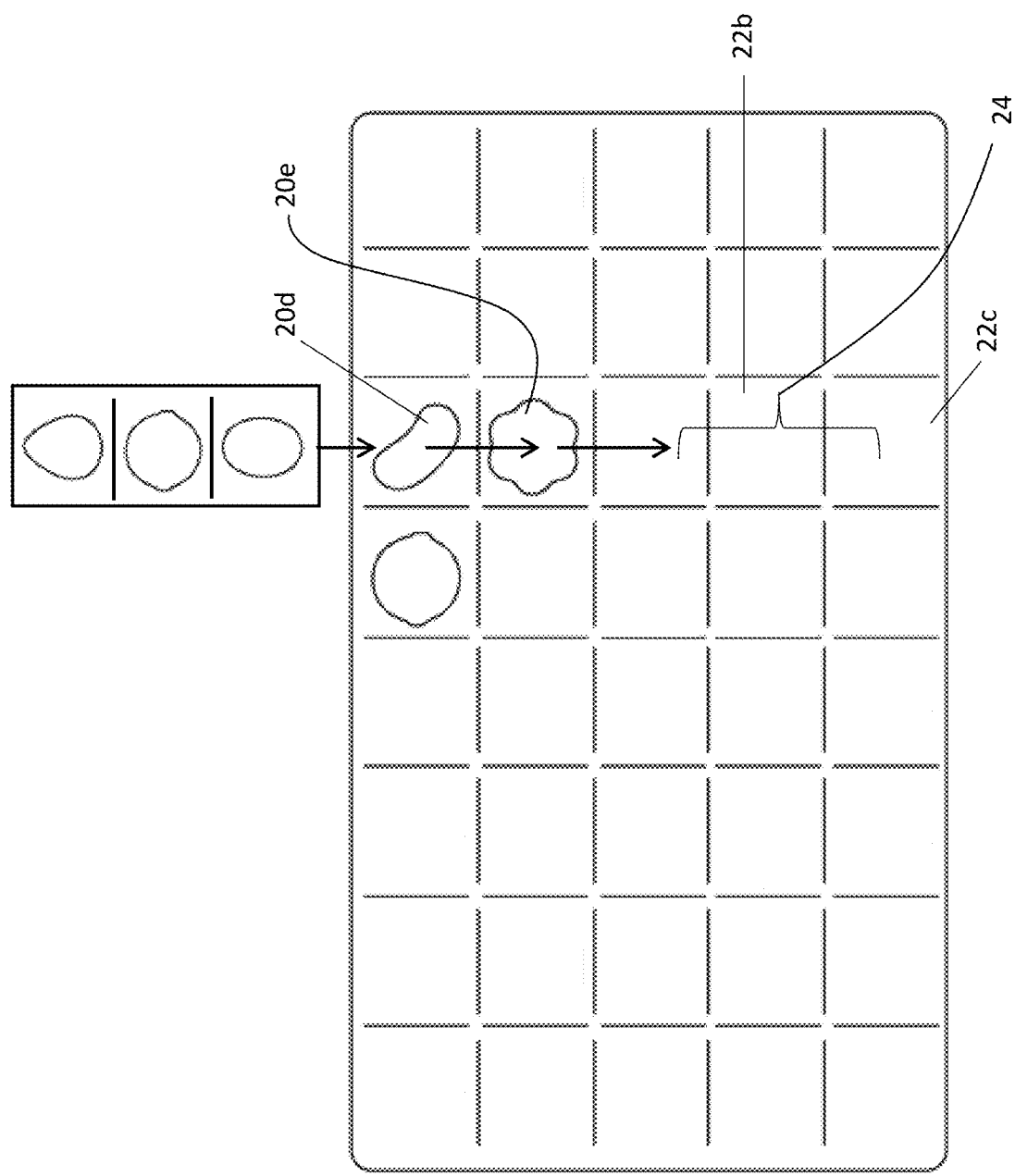
FIG. 2 is a schematic diagram illustrating how a game board is populated with replacement game elements.

In the known version of the match 3 switcher game, the aim of the game is to swap game elements in the shape of candies with each other to make moves on the game board. To gain points the player has to make moves that create matches of at least three of the same game element or candy. In doing so, the player gains points and the matched game elements are removed. As a result new game elements fall into place from the top of the game board in order to fill any spaces created. Assume in FIG. 1 that game element 20c is moved one place to the right to form a three-line match with game elements 20a and 20b. Turning now to FIG. 2, this has the effect of game elements 20a, 20b and 20c being removed or "disappearing" from the game board, creating a visual effect (animation) on the screen to indicate the disappearance, such as a minimal explosion effect. The two game elements which were directly above game elements 20a will now fall downwards into the spaces created by the removal of game elements 20a, 20b and 20c. Thus, game element 20e will end up at the location 22c, and game element 20d will end up at the location 22b. In addition, three new game elements are provided and fall downwards into the game board to fill the remaining three spaces above location 22b. The new game elements may be generated at random. The user then has a new game board on which to play a subsequent move.

Some embodiments may use so-called physics to control movement of game elements when replenishing a game board. For example, some embodiments may use the game physics used in Candy Crush Saga. In this game, game elements drop down from above the game board at from the top of the game board. In an alternative version of this game detailed in U.S. Ser. No. 14/316,274 and launched under the name Candy Crush Soda, the physics can vary so that the direction of replacement game elements can alter. It should be appreciated that the game physics described are by way of example and in other embodiments any suitable game physics may be used. In some embodiments, the replenishment of a game board may be controlled without the use of game physics.

Figure 5:
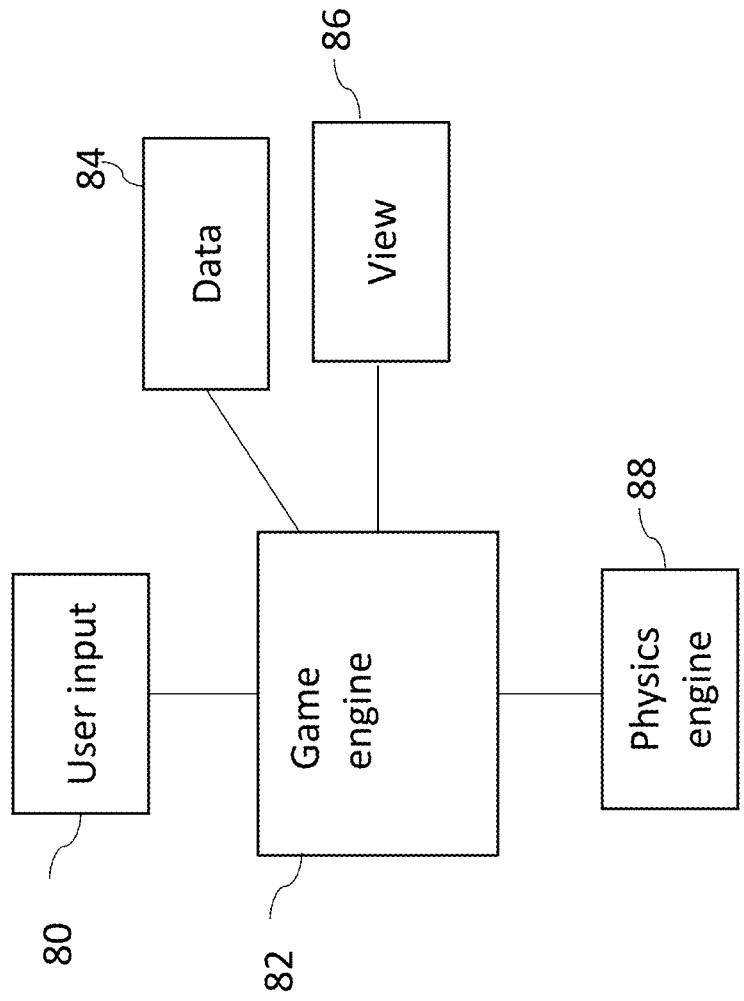
FIG. 5 schematically shows the functional blocks of an embodiment.

Reference is made to FIG. 5 which schematically shows the functional blocks of an embodiment, which may enable game play such as discussed previously. A user input block 80 is shown. This captures the user input and feeds the input to a game engine 82. In the context of the game of some embodiments, this user input may be which game elements are switched by a user. This user input can be via any suitable user interface, such as discussed earlier. One or more of the functional blocks of FIG. 5 may be performed by at least one processor.

The game engine 82 will process the information provided by the user input. The game engine 82 (for example a game model) will determine if a valid combination has been made.

Each game element has data associated therewith. The data 84 may be stored in any suitable memory location. In some embodiments, the data may be considered to be part of the game engine and in other embodiments may be considered to be outside the game engine. The data may provide information as to the properties of the game element. The data may include the position data, that is, information representing the position of the game element in the displayed image.

In some embodiments, the game engine will check if the game elements satisfies the rule or rules for a valid match. The rule or rules which define whether or not a match condition has been satisfied. The match condition will be dependent on the game. In some embodiments, a match condition will be satisfied if the game elements are arranged to provide a sequence of at least three adjacent first objects sharing at least one same characteristic.

Thus, the game engine will be in control of the matching mechanism. The game engine will have access to data for game element including its position and will be able to determine if a match condition has been met.

It should be appreciated that in other embodiments, the game may use any type of match mechanic such as switching, sliding or linking. The game elements may be any suitable game element and in some embodiments may be letters. In that scenario a match will occur when the letters match a word. Preferably the word is at least three letters long.

A physics engine 808 is provided which is configured to control the movement of moving game elements on the display. The tiles are static is some embodiments.

The physics engine 808 may be part of the game engine 802.

A view function 806 uses of the data to provide the displayed image with which the user is able to view and/or interact.

Reference is made to FIG. 6 which schematically shows a method flow for a move.

In step S1, a move input is provided by a user via the user interface. In some embodiments, in order to make a move, a user interacts with the game board via the user interface. The user selects, for example, one or more game elements. The user may move one or more game elements. For example, the selected game elements switches position with another game element.

In step S2, the processor is configured to determine that one or more matches have been made. In other words, the move made by the user causes the game elements to be rearranged. The processor is configured to determine if one or more match conditions have been satisfied. For example, the at least one processor may be configured to determine that at least 3 game elements having a common characteristic are arranged in a row of column. In some embodiments, the user is only permitted to make a move which results in one or more matches being made.

In step S3 responsive to determining a match, the at least one processor is configured to cause one or more of the game elements satisfying a respective match to be removed. It should be noted that in some embodiments, a match may include one or more special game elements which may trigger an additional effect. The removal of the game elements is represented graphically on the display.

In step S4, after the removal of the game elements in step S3, the processor is configured to cause the game board which is displayed on the display to be refilled. Once the game board has been refilled, this is followed by step S5. The removal of the game elements is represented graphically on the display.

In step S5, the at least one processor is configured to once again determine if there are any valid matches on the refilled game board.

If so, the at least one processor is configured to revert to step S3. If not, the next step is step S6. This will end the move of the user and the user is then able to make the next move.

It should be appreciated that in some embodiments, the user is not able to make any moves until there are no more matches on the game board.

Some embodiments are configured to control the rate at which the method proceeds though steps S3 to S5. In some embodiments, subsequent iterations are performed more quickly. This determination of the rate at which the iterations are performed will be described in more detail later.

In some embodiments, during a game there may be in one move, many iterations of the steps S3 to S5. This may provide a cascading effect where one match can result in further matches when the game board is refilled and so on.

Some embodiments may be used in the context of a casual game where providing continuous engagement is a technical challenge. As mentioned there may be potentially many iterations or even a single iteration may be time consuming. If during the course of the game, there is relatively large number of iterations and/or the iterations are taking a relatively long time, the user may no longer be engaged as the user is unable to make their next move. The user may not feel that the iterations are part of the user's game.

Accordingly, some embodiments increase the rate at which the iterations are performed if they exceed a certain amount of time in a single move. Increasing the rate will make these actions appear to be "fast forwarded" as compared to the usual actions. The rate may be increased at the point, for example, when the user is considered to be less engaged. The fast forwarding may increase the user engagement.

It should be appreciated that the rate of a given iteration will also depend on what occurs in that iteration, for example, are there many game elements to be removed, is there the activation of a special game element etc. In some embodiments, as soon as the method lasts more than a given amount of time, the rate is increased. The given amount of time may be of the order of a few seconds, for example 3 seconds. The increase in the rate may be over a further period of time of for example 7 to 12 seconds.

The increased rate or rates may be any suitable range. For example, the increase compared to a normal or default rate may be for example be between 15 and 50%, in some embodiments.

In some embodiments, the user input provided by a user will trigger the displaying of video content, the content being defined by the iterations of the method of FIG. 6. The rate at which the video content is displayed will increase. For example the frame rate may be increased. The video speed may thus be increased.

Figure 7:
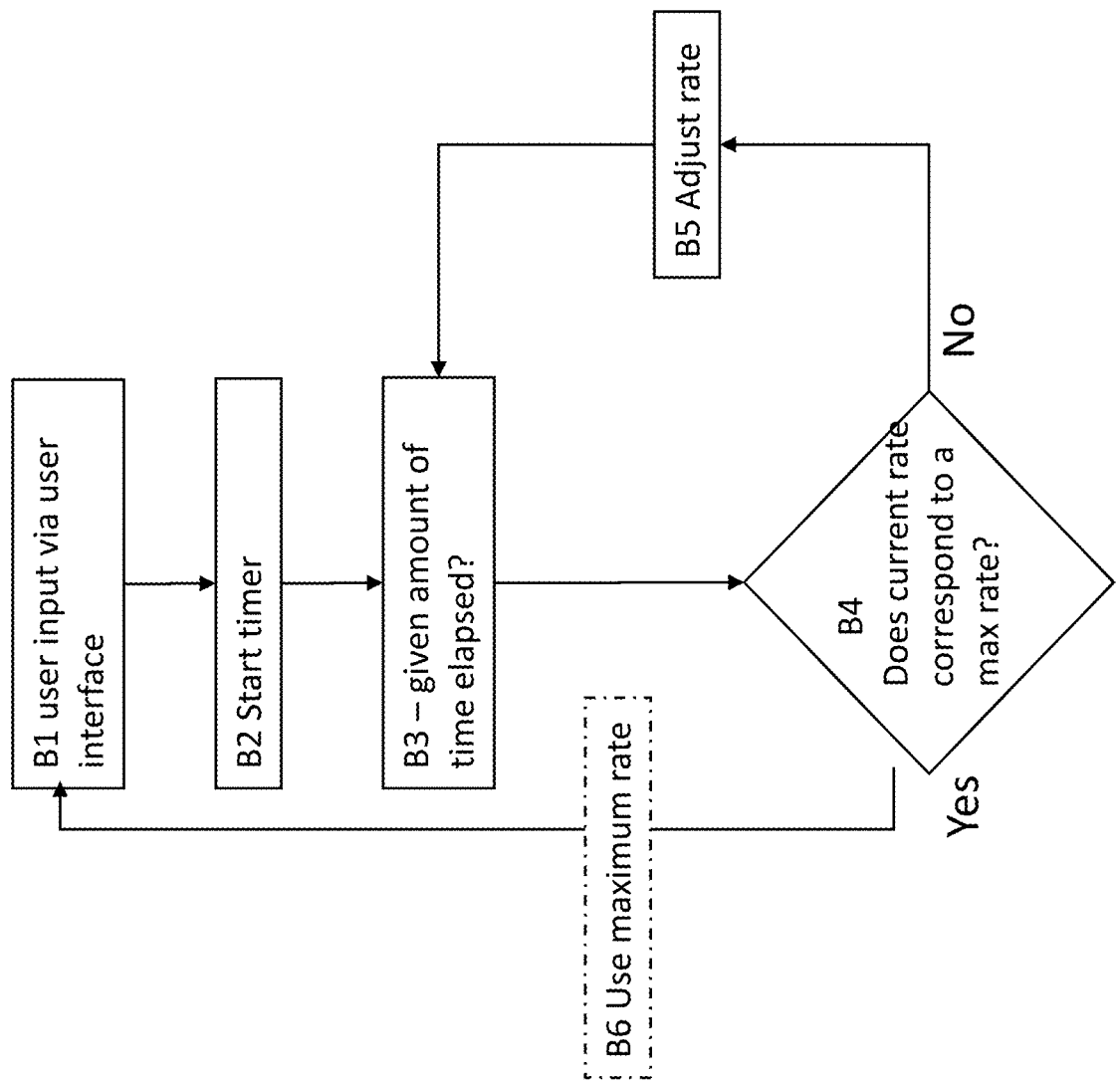
FIG. 7 shows a method flow for determining a rate at which the method flow of FIG. 6 is provided.

Reference is made to FIG. 7 which shows a first embodiment for providing and/or controlling the rate which is used with the method of FIG. 6, for example.

In step B1, a user input is received via the user interface. In some embodiments, this user input is configured to provide a move. In some embodiments, the user is only able to provide an input which constitutes a valid move. In other embodiments, a check is made to see if the input provided by the user provides a valid input. In some embodiments, the user input via the user interface may be to select and move one or more game elements.

In step B2, a timer is started. In some embodiments this may be a count up or time elapsed timer. In some embodiments, the timer may be set to zero. In other embodiments, the timer may be implemented as a countdown timer and may be set to a set value. In other embodiments, a current time may be determined or obtained or used. The current time may be stored in memory.

It should be appreciated that step B2 may take place at the same time as step B1.

In some embodiments, there may be a delay before the timer is set or started.

In step B3, a determination is made that the elapsed time has reached a predetermined value since the timer was initiated in step B2. This may be where the timer has reached a predetermined time. Prior to reaching the predetermined time the default or normal rate will be used.

For example in the case of a count up or a countdown timer, this may be when a particular time value has been reached.

In some embodiments, the time elapsed may be monitored to determine when the predetermined value has been reached.

In the case where a time is stored in step B2, the determination may comprise comparing a current time to the stored time. This may be performed iteratively until the elapsed time reaches the predetermined value.

In step B4, it is determined if a current rate corresponds to a maximum rate.

If not, the next step is step B5 where the rate is adjusted. This may be by using a look up table, performing a function, providing a predefined increase or in any other suitable manner.

Step B5 is followed by step B3. In this subsequent iteration, there may be an updated value for the determination as to whether or not a given amount of time has elapsed.

If it is determined that the current rate does correspond to a maximum rate, then optionally the next step is step B6 where the maximum rate is used. Even if step B6 is not provided, there are no further increases in the rate. In the context of a computer implemented game, the maximum rate is continued until there are not further changes to the game board and the user is able to provide an input for a next move (and the method will go back to step B1). The rate may be reset to a default or normal rate. In the context of other embodiments, the maximum rate is used until the next input by the user. After the next input by the user, the rate may be reset to a default or normal rate.

In some embodiments, in step B4, instead of comparing the current rate to the maximum rate, it may be determined that the elapsed time has reached a particular value. In the case of a countdown timer, this may be when the counter reaches zero. In the case where the timer is a count up timer, this may be when the timer reaches a particular value. In the case where a current time is captured, this may be a given time after the initial captured time.

The method of FIG. 7 may be used to set the rate up to a maximum rate. When the maximum rate is reached, that rate is used until the game board reaches a stable state and there are no more matches. The rate may be reset to the default or normal value which is the initial rate used when the user makes their next move. The rate may be reset when the user makes their next move, when the timer is started or when the game board is stable and there are no further matches.

In those embodiments, where the rate has not yet reached the maximum value and the game board is stable, the rate is reset in a similar way as described in relation to the resetting of the maximum rate.

In other embodiments, the method of FIG. 7 may be used to set the rate up to a maximum rate. When the maximum rate is reached, that rate is used. The rate may be reset to the default or normal value which is the initial rate used after the next user input. The rate may be reset when the user makes their input, when the timer is started or in response to some other trigger.

Figure 8:
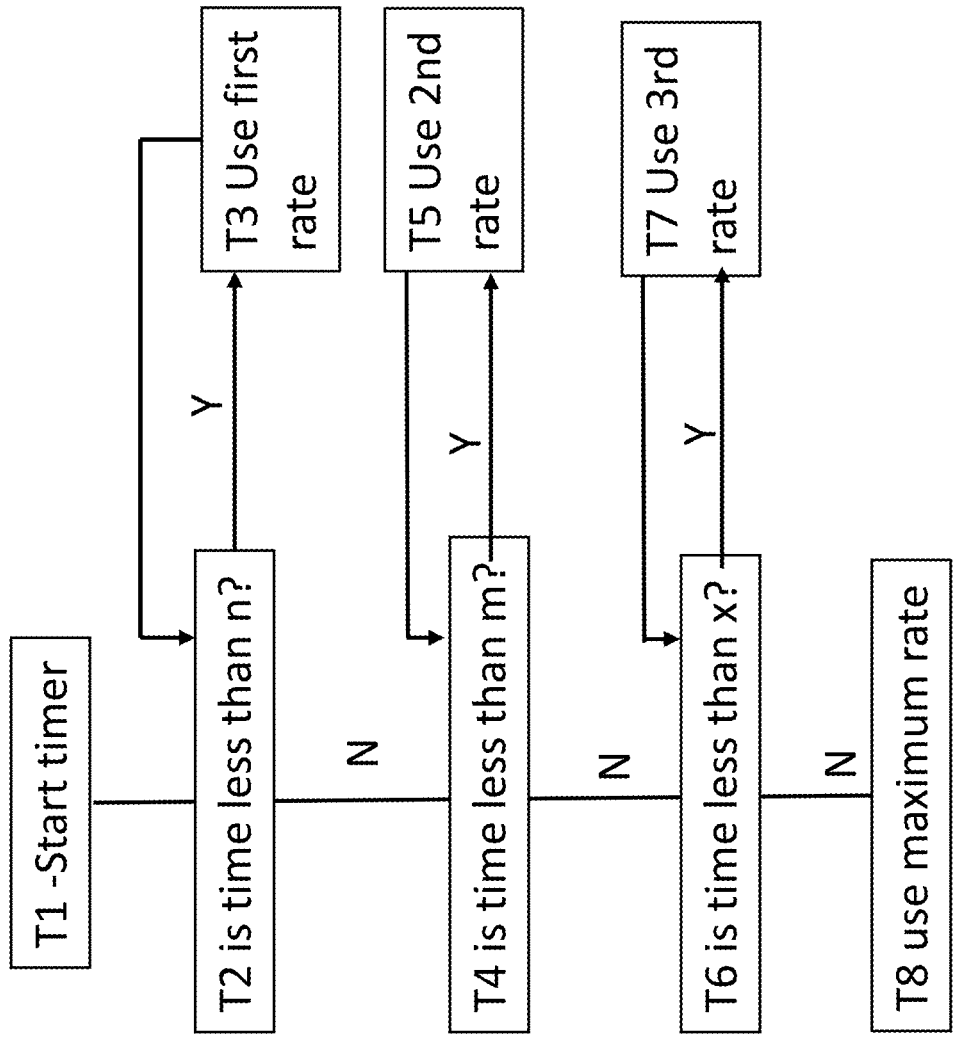
FIG. 8 shows another method for determining a rate at which the method flow of FIG. 6 is provided.

Reference is made to FIG. 8 which shows some example embodiments for determining the rate.

In Step T1, a timer is started. In some embodiments, this may be when the user has selected and moved a given element. The timer may be started at any suitable point in other embodiments. For example, the timer can be started at the point that the first iteration has been completed or after a given amount of time. For example, once the game board has been refilled, it is at this point that the timer may be started. The timer may be started in association with any one of steps S1, S2, S3, S4 or S5. For example, this may be during a first iteration through a respective step.

In the step T2, it is determined if the time elapsed less than n seconds. The value of n can be any suitable value. In some embodiments, n may be the order of a few seconds. In some embodiments, for example, n may be 3 seconds. Of course n may be more or less than 3 seconds in other embodiments.

If the time since the timer started is less than n, then the next step is step T3. This will ensure that a first rate is used to progress through one or more iterations of the method of FIG. 6. The method will then loop back to step T2. It should be appreciated that this may be used to set an initial rate. This first rate may be a normal or default rate.

In step T2, if it is determined that the time elapsed since the timer is started is more than n, then the next step is step T4. In step T4, it is determined whether the time is elapsed is less than a value m. m is greater than n and may be any suitable value. If it is determined that the time elapsed is less than m, then the next step is step T5. This will ensure that a second rate is used to progress through one or more iterations of the method of FIG. 6. The method will then loop back to step T4.

In some embodiments, the second rate is greater than the first rate. Of course, in other embodiments, the second rate may be different to the first rate.

In step T4, if it is determined that the time elapsed since the timer is started is more than m, then the next step is step T6. In step T6, it is determined if the time elapsed is less than a value x. x is greater than m and n and may be any suitable value. If it is determined that the time elapsed is less than x, then the next step is step T7. This will ensure that a third rate is used to progress through one or more iterations of the method of FIG. 6. The third rate may be greater than the second rate and the first rate or at least different to the second rate. The method will then loop back to step T6.

In step T8, if it is determined that the time elapsed since the timer is started is more than m, then a fourth maximum rate is used to progress through any remaining iterations of the method of FIG. 6. The fourth rate may be greater than any of the rates.

In some embodiments, the first rate may be the initial rate used. In other embodiments, the first rate may be an increased rate as compared to an initial rate used. The initial rate may be a default rate.

In the example shown in FIG. 8, there are four different rates. It should be appreciated that in some embodiments of there may be only one rate in addition to an initial rate giving two rates in total. Of course in other embodiments, there may be more than two rates in total.

In other embodiments, there may of course be more than four rates.

In some embodiments a look up table may be provided. An elapsed time may provide an input and the associated rate may be output. More than one time may be associated with a given rate in some embodiments.

Figure 9:
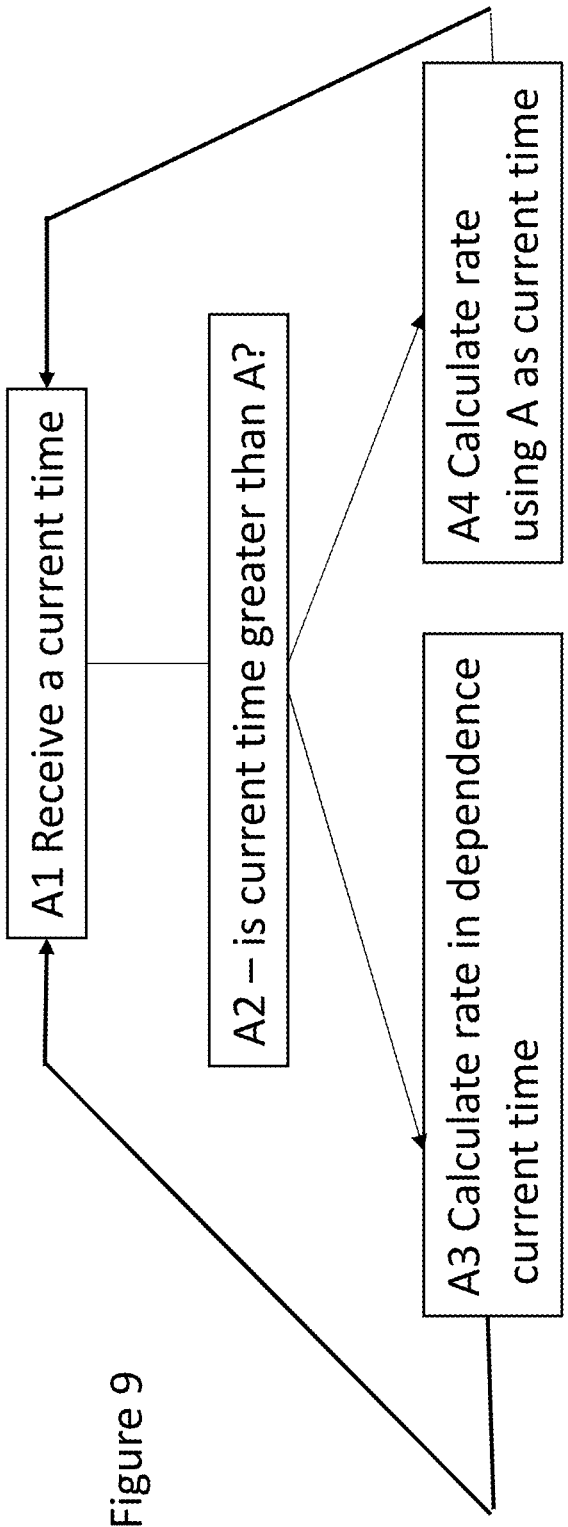
FIG. 9 shows another method for determining a rate at which the method flow of Figure is provided.

Reference is made to FIG. 9 which shows another examples of embodiments for determining the rate which is used to progress through one or more iterations.

In step A1, the at least one processor is configured to receive a current time from a timer. It should be appreciated that the timer may be initiated such as discussed in relation to FIG. 7 or 8.

In step A2, it is determined if the current time is greater than A.

If the current time is A or less, then the next step is step A3.

In step A3, a function f (t) is used to determine a rate. The function is dependent on the current time. This rate is used as the current rate. The method will then revert to step A1.

If the current time is greater than A, then the next step is step A4 when the current rate is determined using the function f (t) but using A as the maximum time. This is to provide a maximum rate. This rate is used as the current rate. The method will then revert to step A1.

In one modification to the method of FIG. 9, when the current rate is greater than A, then no further iterations of the method of FIG. 9 are performed.

In one modification to the method of FIG. 9, when the current rate is a maximum rate, then no further iterations of the method of FIG. 9 are performed.

In some embodiments, the rates may be determined by performing an algorithm as required. In other embodiments, the rates may be determined using a look up table.

It should be appreciated that one or more of the options outlined in relation to one or more of FIGS. 7, 8 and 9 can be used with one or more other ones of FIG. 7, 8 or 9.

Figure 10:
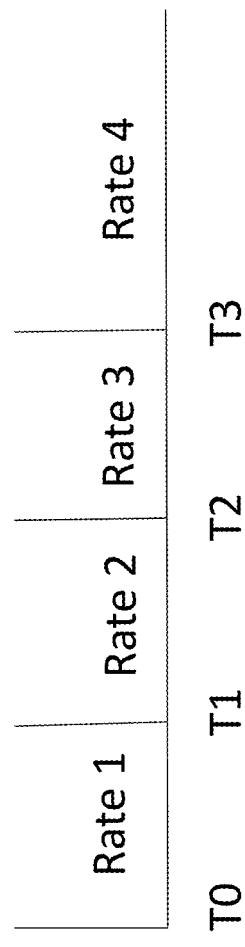
FIG. 10 schematically shows a first rate change pattern with respect to time.

Reference is made to FIG. 10 which schematically shows different options for updating the rate with respect to elapsed time.

This may be as set out for example in relation to FIG. 9.

A first rate, rate 1, is used at time T0 to Time T1. Between time T1 to T2, a second rate, rate 2 is used. Between time T2 and T3, a third rate, rate 3 is used. After Time T3, a fourth rate, rate 4 is used.

In the example shown in FIG. 10, the time between time T0 and T1 is the same as that between T1 and T2 as well as that between time T2 and T3. This is by way of example only and another embodiments, the amount of time between T0 and T1 may be different to that between T1 and T2 and/or time T2 and T3. The number of time intervals may be dependent on the number of different rates which may be two or more.

Figure 11:
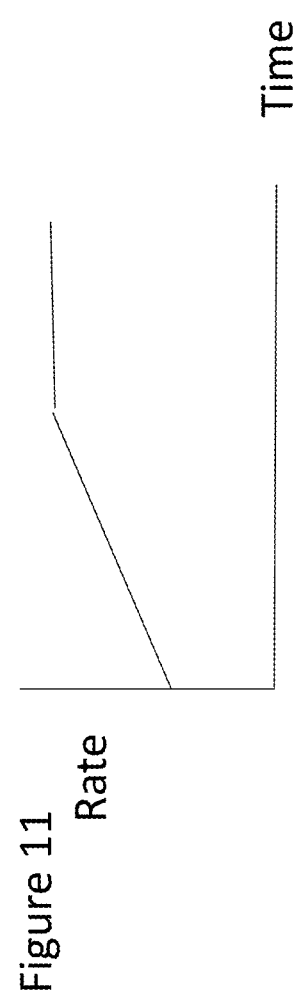
FIG. 11 schematically shows a second rate change pattern with respect to time.

Reference is now made to FIG. 11 which schematically shows a graph rate against time in another embodiment. There is an initial rate which is used when the method first starts. As time increases, the rate is increased. While FIG. 10 shows a linear increase in the rate, in some embodiments, they may be stepped changes in rate as the rate is updated for subsequent iterations of the method of Figure. It should be noted that once the rate exceeds a given amount, the rate plateaus and does not increase further.

In other embodiments, there may be a non-linear increase in the rate. The rate may increase exponentially in some embodiments.

It should be appreciated that although the previous embodiments have been described in the context of a switcher game, other embodiments may be used with any other matching game.

It should be appreciated that other embodiments may be used with any other game, both casual and non-casual games.

Embodiments may be used with single player or multi-player games.

Some embodiments may have application where a user provides a first input. That input may be a turn or move. Before the user is able to make a next turn or move or any next input, the game is configured to show a graphic or video. The speed of the graphic or video may be increased using any of the previously described embodiments. There may be a variable amount of information which is displayed by the graphic or video. The graphic or video which is shown may be dependent on the current state of the game and the input provided by the user. In some embodiments, the graphic or video may show one or more events which are triggered by the user input followed by one or more further events which are triggered by the one or more events triggered by the user input. In some embodiments, there may be further triggering of events based on the one or more further events.

The above mentioned embodiments have been described in the context of a computer implemented game. However it should be appreciated that some embodiments may be provided in the context of for example, non-computer game related apps. For example, some embodiments may be provided in any suitable app where the user is required to provide an input via the user interface. In response to that input, the app is configured to display a graphic or video which is triggered or responsive to the user input. This graphic or video which is triggered may have a variable quantity of information which is to be displayed. Accordingly the rate at which this information is displayed may be increased using any of the previously described methods. While the graphic is being displayed, the user may be prevented from providing a next input.

For example, consider a navigation app. The user may provide an input which allows a route to be previewed. The rate at which the route is previewed may increase, using any of the embodiments previously described. At the end of the displaying of the previewed route, the user is able to provide a further input, Consider an app which allows a user to provide a photo album. The user may provide an input which allows a photo album to be previewed. The rate at which the album is previewed may increase, using any of the embodiments previously described. At the end of the displaying of the album, the user is able to provide a further input, Of course, other embodiments may be applied to any other suitable app.

In the above described embodiments, the rate is increased over time. It should be appreciated that in other embodiments, the rate may controlled in other ways. For example the rates may be decreased. The rates may be varied in dependence on the images to be displayed. Different types of images may be displayed with different rates. In some embodiments, there may be a plurality of rates. Each of the rates may be individually controlled. In some embodiments, the rates may vary such that between user inputs the rate may sometimes increase and sometimes decrease.

Various methods and devices have been described. It should be appreciated that these methods may be implemented in apparatus or devices comprising any suitable circuitry. Some embodiments may be implemented by at least one memory and at least one processor. The memory is provided by memory circuitry and the processor is provided by processor circuitry. Some embodiments may be provided by a computer program running on the at least one processor. The computer program may comprise computer implemented instructions which are stored in the at least one memory and which may be run on the at least one processor. A computer program product may be provided which comprises computer program product comprising code embodied on a computer-readable medium which is configured to be executed on a processor of the computer or user device. In some embodiments, a non-transitory computer readable storage device may be provided to store program code instructions that, when executed by at least one processor causes any of the above described methods to be performed.

A person skilled in the art will realise that the different approaches to implementing the game is not exhaustive, what is described herein are certain preferred embodiments. It is possible to implement the way in a number of variations without departing from the scope of the invention as claimed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer device comprising:
   a display configured to display game elements in a game board of a computer implemented game;
   a user interface configured to detect a first user input when a user engages with at least one game element in a move; and
   at least one processor configured to determine that:
   (i) at least one game element is to be removed from the game board which is displayed on the display,
   (ii) cause the game board which is displayed on the display to be refilled,
   wherein when the game board has been refilled, the at least one processor is configured to repeat steps (i) and (ii) until there are no game elements which are to be removed in a refilled game board, wherein the at least one processor is configured to cause images showing at least the removal of the game elements and the refilling of the game board to be displayed on the display at a rate which increases over time.

2. The computer device as claimed in claim 1, wherein the rate is increased to a maximum rate.

3. The computer device as claimed in claim 1, comprising a timer, the timer being started in response to the first user input.

4. The computer device as claimed in claim 3, wherein the timer is one of a count up and a countdown timer.

5. The computer device as claimed in claim 1, wherein the at least one processor is configured to capture a current time in response to the first user input.

6. The computer device as claimed in claim 1, wherein the at least one processor is configured to determine a current rate as the rate, the current rate being dependent on a time from the first user input.

7. The computer device as claimed in claim 1, wherein the at least one processor is configured to determine if at least a first given time from the first user input has elapsed and only if the first given time has elapsed to increase the rate from a default rate.

8. The computer device as claimed in claim 1, wherein the at least one processor is configured to determine if at least a second given time from the first user input has elapsed and if so to maintain a current rate.

9. The computer device as claimed in claim 1, wherein the at least one processor is configured to iteratively increase the rate up to a maximum rate.

10. The computer device is claimed as claimed in claim 1, wherein the at least one processor is configured to determine a current rate by adding a predefined value to a previous rate.

11. The computer device as claimed as claimed in claim 1, wherein the at least one processor is configured to determine a current rate by performing a function.

12. The computer device as claimed in claim 1, wherein the at least one processor is configured to determine a current rate by performing a look up operation.

13. The computer device as claimed in claim 1, wherein the at least one processor is configured to determine that steps (i) and (ii) have been performed for at least a given amount of time and in response thereto to increase the rate over time up to a maximum rate.

14. The computer device as claimed in claim 1, wherein the at least one processor is configured such that the user input is configured to receive a second user input when a user engages with at least one game element in a next move only when there are no game elements to be removed.

15. The computer device as claimed in claim 1, wherein the at least one processor is configured in step (i) to determine that at least three game elements satisfy a match condition and in response thereto to remove the game elements.

16. A computer implemented method comprising:
   displaying on a display game elements in a game board of a computer implemented game;
   detecting, via a user interface, a first user input when a user engages with at least one game element in a move;
   (i) determining by at least one processor that at least one game element is to be removed from the game board which is displayed on the display,
   (ii) causing, by the at least one processor, the game board which is displayed on the display to be refilled,
   wherein when the game board has been refilled, repeating steps (i) and (ii) until there are no game elements which are to be removed in a refilled game board,
   the method comprising causing images showing at least the removal of the game elements and the refilling of the game board to be displayed on the display at a rate which increases over time.

17. The computer implemented method as claimed in claim 16, wherein the rate is increased to a maximum rate.

18. The computer implemented method as claimed in claim 16, comprising starting a timer in response to the first user input.

19. The computer implemented method as claimed in claim 16, comprising determining if at least a first given time from the first user input has elapsed and only if the first given time has elapsed to increase the rate from a default rate.

20. The computer implemented method as claimed in claim 16, comprising determining if at least a second given time from the first user input has elapsed and if so to maintain a current rate.

21. The computer implemented method as claimed in claim 16, comprising iteratively increasing the rate up to a maximum rate.

22. The computer implemented method as claimed in claim 16, comprising determining a current rate by one or more of: performing a function; adding a predefined value to a previous rate; and performing a look up operation.

23. The computer implemented method as claimed in claim 16, comprising determining that steps (i) and (ii) have been performed for a least a given amount of time and in response thereto to increase the rate over time up to a maximum rate.

24. The computer implemented method as claimed in claim 16, comprising receiving a second user input when a user engages with at least one game element in a next move only when there are no game elements to be removed.

25. A computer readable non-transitory storage medium carrying one or more computer executable instructions which when run on at least one processor cause:
   displaying on a display game elements in a game board of a computer implemented game;
   detecting a first user input when a user engages with at least one game element in a move;
   (i) determining that at least one game element is to be removed from the game board which is displayed on the display,
   (ii) causing the game board which is displayed on the display to be refilled,
   wherein when the game board has been refilled, repeating steps (i) and (ii) until there are no game elements which are to be removed in a refilled game board, and
causing images showing at least the removal of the game elements and the refilling of the game board to be displayed on the display at a rate which increases over time.

26. A computer device comprising:
a display configured to display images;
a user interface configured to detect user input when a user engages with an app;
at least one processor configured to, in response to the user input to cause a series of images to be displayed on the display, whereby a subsequent input by the user via the user interface is only actioned by the at least one processor when all of the series of images have been displayed, the at least one processor being configured to increase the rate at which the series of images are displayed over time.

27. A computer device comprising:
a display configured to display game elements of a computer implemented game;
a user interface configured to detect user input when a user engages with a game element in a move; and
at least one processor configured to:
cause a series of images to be displayed, whereby a subsequent move by the user via the user interface is only permitted by the at least one processor when all of the series of images have been displayed, the at least one processor being configured to increase the rate at which the series images are displayed over time.

* * * * *